United States Patent [19]
Weber

[11] Patent Number: 5,026,150
[45] Date of Patent: Jun. 25, 1991

[54] SPECTACLES

[75] Inventor: Karl Weber, Stuttgart, Fed. Rep. of Germany

[73] Assignee: Polaroid Corporation, Cambridge, Mass.

[21] Appl. No.: 423,399

[22] PCT Filed: Mar. 24, 1988

[86] PCT. No.: PCT/EP88/00244

§ 371 Date: Sep. 26, 1989

§ 102(e) Date: Sep. 26, 1989

[87] PCT Pub. No.: WO88/07699

PCT Pub. Date: May 15, 1980

[51] Int. Cl.$^5$ .................................................. G02C 1/00
[52] U.S. Cl. .......................................... 351/47; 351/57; 351/86
[58] Field of Search .................. 351/41, 47, 57, 86, 351/154

[56] References Cited
U.S. PATENT DOCUMENTS 4,357,080 11/1982 Solomon .
4,779,971 10/1988 Lhospice ............................. 351/86
4,824,234 4/1989 Sparks et al. ........................ 351/47
4,834,523 5/1989 Porsche ................................ 351/57
4,973,148 11/1990 Gazeley .............................. 351/57

FOREIGN PATENT DOCUMENTS 0193325 9/1986 European Pat. Off. .
8711033 11/1987 Fed. Rep. of Germany .
8107453 10/1982 France .

Primary Examiner—Rodney B. Bovernick
Assistant Examiner—J. D. Ryan
Attorney, Agent, or Firm—Karl Hormann

[57] ABSTRACT

In spectacles, the lens is to be mounted on the frame in an especially simple manner and for this purpose hooks are arranged at the lower sections of the frame and additional hooks are provided on the lens below the upper cross piece which are arranged on opposite sides of the rod connecting cross piece and nose piece. The sections of the upper cross piece extending on either side of the rod being elastically deformable to the point of the release of the additional hooks provided on the lens. Protrusions arranged on the lens abut against opposite sides of the rod.

7 Claims, 3 Drawing Sheets

SPECTACLES

The invention relates to spectacles having a metallic frame made up of an upper cross piece, a nose piece, lateral pieces and lower frame sections, as well as a lens mounted at the front of the frame by hooks arranged at the lower frame sections.

The task of the invention is to form spectacles of this kind in such a way that the lens may be mounted into the frame in an especially simple fashion. Nevertheless, the connection between the lens and the frame is to be easily releasable so that lenses of different colors may easily be exchanged, or in such a manner that in the case of a broken lens a new lens may be easily and quickly inserted. In particular, in this manner a frame of as simple a structure as possible and with the least possible solder spots is to be assured.

In accordance with the invention the task is accomplished by the fact that the upper cross piece and the nose piece are connected by a rod, also of metal, extending vertically centrally of the spectacles, that additional hooks are provided on the lens below the upper cross piece which hooks extend from below around the portions of the cross bar extending on both sides of the rod, the portions of the cross piece extending on either side of the rod being elastically deformable to the point at which the additional hooks provided on the lens may be released, and that protrusions also provided on the lens abut against the rod from both sides.

The frame or, rather, the portions of the upper cross piece extending on either side of the rod may easily and in a reversible manner be temporarily elastically be distorted in such a manner but it moves slightly out of the two additional hooks on the lens. Thus, the lens becomes removable. Conversely, the lens may be inserted into the hooks by slightly distorting the frame, by utilizing on the one hand, the hooks provided at the lower frame pieces and, on the other, by utilizing the additional hooks provided on the lens. The hooks wrap on to the frame and secure a reliable and simple connection which may easily be released, as for repair or exchange of the lenses. At the same time, the frame structured in an especially simple manner. By comparison with conventional frame structures many soldered spots are avoided. The rod provides the necessary rigidity to the frame, at the same time leaving, however, the limited slight degree of flexibility necessary to flex the frame sufficiently to separate the lens from the frame.

Advantageous embodiments of the inventions are defined in the subclaims. An embodiment of the invention and of its advantageous improvements will be described with reference to the appended drawings, in which FIG. 1 depicts a perspective view of a pair of spectacles with the frame being separated from the lens;

Figure 1:
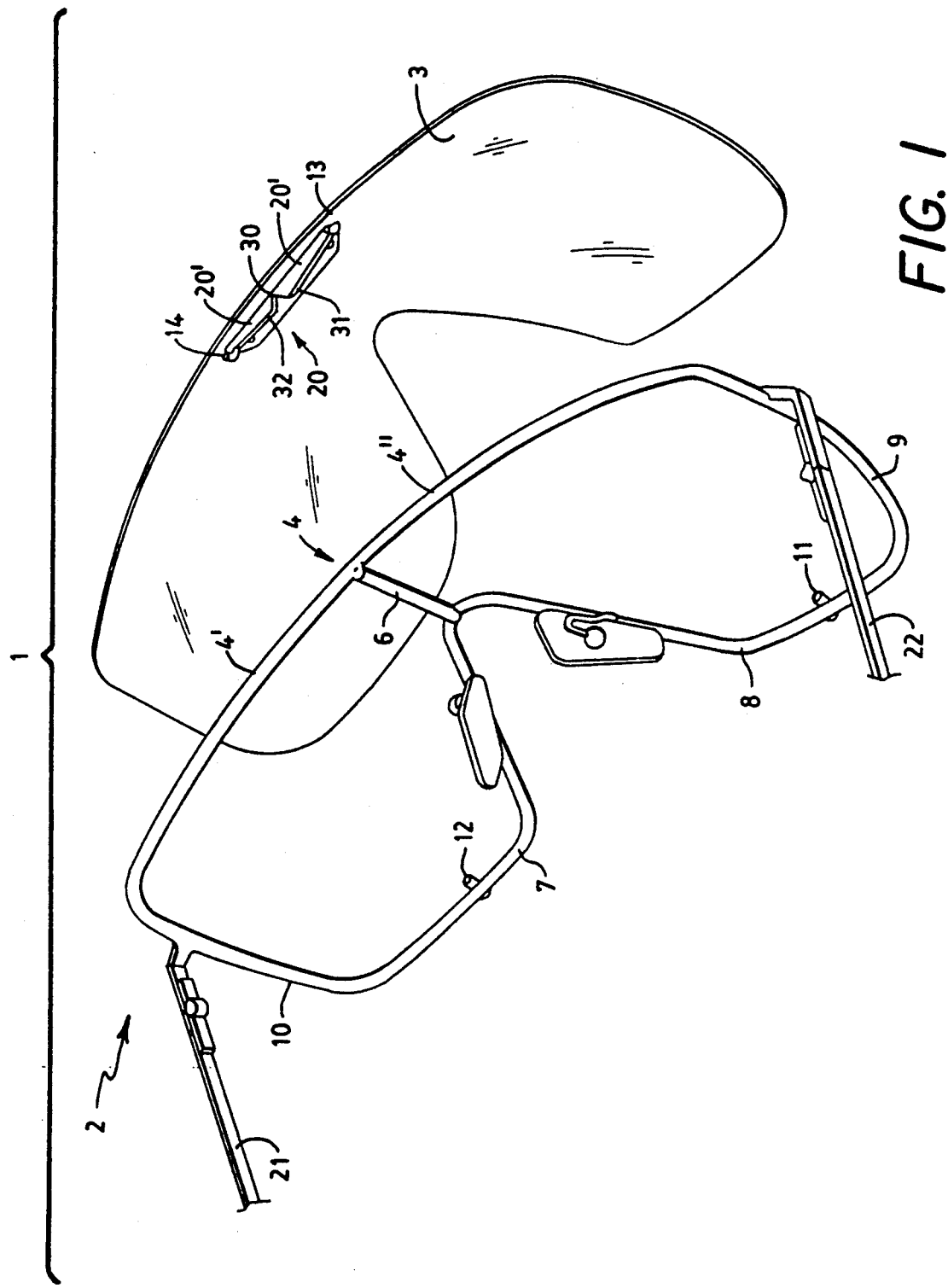
Figure 2:
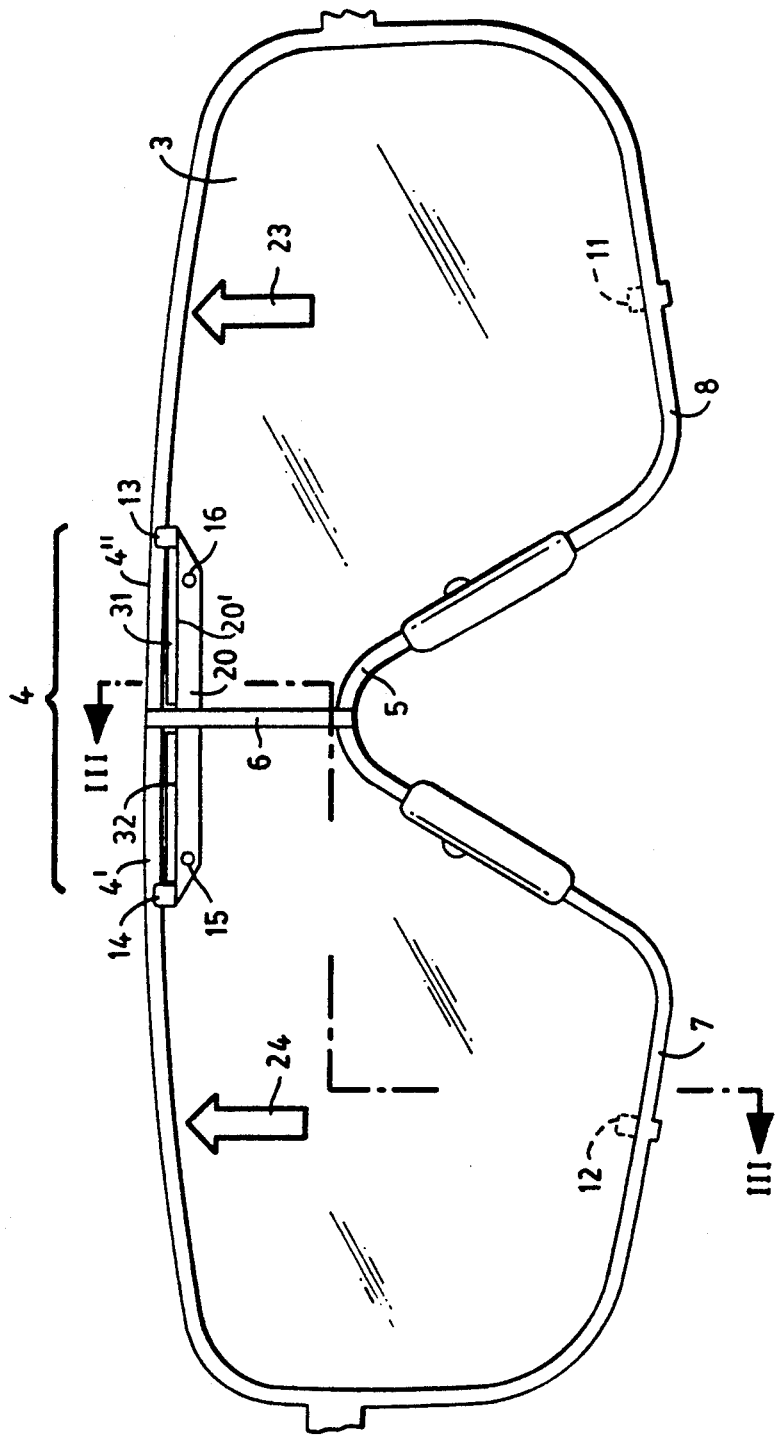
FIG. 2 depicts a frontal view of the lens wit the frame mounted.
Figure 3:
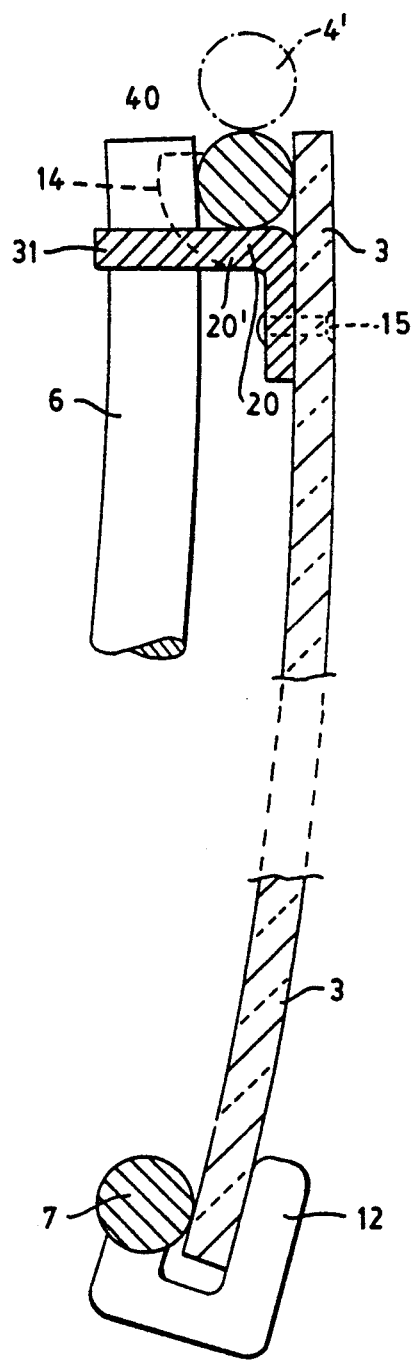
FIG. 3 is a cross-sectional along line III—IV of FIG. 2.

The spectacles 1 are made up of a frame 2 and a lens 3. The frame 2 is integrally bent of round wire and comprises an upper cross piece 4, a nose piece 5, lower frame sections 7, 8 and lateral sections 9, 10. The upper frame piece 4 is connected to the nose piece 5, centrally of the spectacles, by a vertically extending metallic rod 6. The rod 6 is soldered to the nose piece 5 and the upper cross piece 4. See the solder spot 40 in FIG. 3.

Two hooks 11, 12 are soldered to the lower frame sections 7, 8. Two further hooks 13, 14 are constituted by the lateral ends of a planar member 20' of a support rail 20 riveted to the lens 3 at 14, 15. The lens 3 is maintained in engagement with the front of the frame 2. This is accomplished by the hooks 11, 12 extending around the lens from below and the hooks 13, 14 extending from below around the frame, i.e. the sections 4', 4" of the cross piece 4 extending on either side of the rod 6.

If one grasps the spectacles 1 with both hands at their temple pieces 21, 22 and squeezes the sections 4', 4" of the frames in the direction of arrows 23, 24 upwardly with one's thumbs while holding on to the lens 3, the sections 4', 4" of the frame 2 are slightly deformed in the sense that the distance between the lower hooks 11, 12 and the sections 4', 4" is slightly increased so that the upper cross piece 4 may be lifted out of the hooks 13, 14 on the support rail 20. See the dash-dotted position of the section 4' in FIG. 3. In this position, the lens may also be taken out of the lower hooks 7, 8.

To mount the lens 3 its lower margin is inserted into the hooks 7, 8; at the same time the frame sections 4', 4" are slightly deformed in an upward direction so that the hooks 13, 14 may be pushed through below the upper cross piece 4 of the sections 4', 4" and snap in after releasing the frame whereby they partially seize the sections 4', 4" from below.

The frame is made of an alloy of copper and beryllium which on the one hand is rather rigid and durable but which is elastically deformable to the extent here indicated. Only the support rail with the two hooks 13, 14 need be fastened to the lens.

Centering the lens 3 on the frame 2 is accomplished by recess 30 provided in the planar member 20' of the support rail 20 the two sides 31, 32 of which form protrusions which in the mounted condition abut the rod 6 at opposite sides.

What is claimed is:

1. Spectacles comprising a metallic frame (2) comprising an upper cross piece (4), a nose piece (5), lateral sections (9, 10) and lower frame sections (7, 8) as well as a lens (3) which is supported in front of the frame by hooks (11, 12) arranged on the lower frame sections (7, 8), characterized by the fact that the upper cross piece (4) and the nose piece (5) are connected by a metallic rod (6) extending vertically centrally of the spectacles, that additional hooks (13, 14) are provided on the lens (3) below the upper cross piece (4) which extend from below around the sections (4', 4") of the upper cross piece (4) extending on either side of the rod (6), the sections (4', 4") of the cross piece (4) extending on either side of the rod (6) being elastically deformable to the point where the additional hooks (13, 14) provided on the lens (3) are released, and that protrusions (31, 32) also provided on the lens abut against both sides of the rod (6).

2. Spectacles in accordance with claim 1, characterized by the fact that the said additional hooks (13, 14) arranged on the lens (3) are formed by the ends of a metallic support rail (20) arranged on the lens (3).

3. Spectacles in accordance with claim 2 characterized by the fact that the support rail (20) comprises a horizontal planar member (20') on which the additional hooks (13, 14) are laterally arranged and which is centrally provided with a recess (30) which receives the rod (6) and the parts of which arranged on opposite sides of the rod (6) from the said protrusions (30, 31).

4. Spectacles in accordance with claim 3 characterized by the fact that the support rail (20) is affixed to the lens (3) by means of rivets (15, 16).

5. Spectacles in accordance with claim 1 characterized by the fact that the frame (2) is integrally formed of wire.

6. Spectacles in accordance with claim 5 characterized by the fact that the frame is formed of an alloy of copper and beryllium.

7. Spectacles in accordance with claim 1 characterized by the fact that the rod (6) is soldered (40) to the frame (2).

* * * * *